United States Patent
Obayashi

(10) Patent No.: US 7,062,273 B2
(45) Date of Patent: Jun. 13, 2006

(54) MOBILE COMMUNICATION TERMINAL APPARATUS HAVING AN ARRAY ANTENNA FOR COMMUNICATION TO AT LEAST ONE BASE STATION

(75) Inventor: Shuichi Obayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 783 days.

(21) Appl. No.: 10/023,941

(22) Filed: Dec. 21, 2001

(65) Prior Publication Data

US 2002/0082016 A1    Jun. 27, 2002

(30) Foreign Application Priority Data

Dec. 25, 2000  (JP)  ............... 2000-393202

(51) Int. Cl.
*H04Q 7/20* (2006.01)
*H04B 7/00* (2006.01)

(52) U.S. Cl. ............... 455/436; 455/562.1; 455/442; 455/273; 342/371; 342/372; 342/374

(58) Field of Classification Search ............... 455/562, 455/436, 273, 272
See application file for complete search history.

(56) References Cited

U.S. PATENT DOCUMENTS

| | | | | |
|---|---|---|---|---|
| 5,854,612 A | * | 12/1998 | Kamiya et al. | ............ 342/383 |
| 5,933,112 A | * | 8/1999 | Hiramatsu et al. | .......... 342/372 |
| 6,087,986 A | * | 7/2000 | Shoki et al. | ................ 342/383 |
| 6,249,249 B1 | | 6/2001 | Obayashi et al. | |
| 6,593,880 B1 | * | 7/2003 | Velazquez et al. | .......... 342/367 |
| 6,650,911 B1 | * | 11/2003 | Kang et al. | ............. 455/562.1 |

FOREIGN PATENT DOCUMENTS

| | | |
|---|---|---|
| EP | 0 674 455 | 9/1995 |
| EP | 0 991 197 | 4/2000 |
| JP | 11-74831 | 3/1999 |
| JP | 2000-307489 | 11/2000 |
| JP | 2002-262328 | 9/2002 |
| WO | WO 98/16077 | 4/1998 |
| WO | WO 00/54540 | 9/2000 |

OTHER PUBLICATIONS

Ayman F. Naguib, Capacity improvement of base-station antenna arrays cellular CDMA, 1993,IEEE pp. 1437-1441.*

* cited by examiner

*Primary Examiner*—Temica Beamer
*Assistant Examiner*—S. Smith
(74) *Attorney, Agent, or Firm*—Oblon, Spivak, McClelland, Maier & Neustadt, P.C.

(57) ABSTRACT

A mobile communication terminal apparatus which performs radio communication with base stations using an adaptive array antenna which obtains an antenna output by multiplying output signals from the respective antenna elements of an array antenna by weighting factors using multipliers, and adding the resultant data using an adder estimates the arrival direction of radio waves from the base station, and starts adaptive control on the adaptive array antenna, at the time of handover from the one base station to the other base station, by using as initial values the weighting factors obtained in accordance with the arrival direction estimation result obtained prior to the handover.

18 Claims, 12 Drawing Sheets

| Terminal ID | Active set | Candidate set | Neighbor set |
|---|---|---|---|
| A | b, d | c | f |
| B | e | g, s | k, r, q |
| ⋮ | ⋮ | ⋮ | ⋮ |
| N | m, p | h, i | n |

MOBILE COMMUNICATION TERMINAL APPARATUS HAVING AN ARRAY ANTENNA FOR COMMUNICATION TO AT LEAST ONE BASE STATION

CROSS-REFERENCE TO RELATED APPLICATIONS

This application is based upon and claims the benefit of priority from the prior Japanese Patent Application No. 2000-393202, filed Dec. 25, 2000, the entire contents of which are incorporated herein by reference.

BACKGROUND OF THE INVENTION

1. Field of the Invention

The present invention relates to a mobile terminal apparatus for performing radio communication with a base station and, more particularly, to a mobile communication terminal apparatus using an adaptive array antenna.

2. Description of the Related Art

An adaptive array antenna is an antenna which weights outputs from a plurality of antenna elements comprising an array antenna and arrayed in a predetermined shape by multiplying the outputs by weighting factors and can adaptively change directivity by controlling the weighting factors. Recently, a radio communication system with mobile communication terminals equipped with such adaptive array antennas has been under research and development.

FIG. 16 shows a typical example of a radio communication system using such mobile communication terminals. A mobile terminal 1000 adaptively controls weighting factors for a mounted adaptive array antenna 1010 to synthesize a beam pattern 1011 whose directivity is set toward a base station 1001 for the other party, thereby communicating with the base station 1001. This makes it possible to suppress transmission power and reduce power consumption as compared with a case where each mobile terminal is equipped with an omnidirectional antenna. When, therefore, this mobile terminal uses a power supply with a limited capacity, e.g., a battery, it can perform communication for a longer period of time. In addition, since radiation of interference power in other directions can be suppressed, interference with base stations other than the base station 1001 in communication can be suppressed.

In such a radio communication system, handover is performed when reception electric field strength necessary for the continuation of communication cannot be obtained as the mobile terminal 1000 gradually moves away from the base station 1001 for the other party. At the time of handover, it is required to synthesize a new beam pattern 1012 whose directivity is set toward a base station 1002 to which the mobile terminal 1000 is located close upon movement. To newly synthesize a beam pattern for the adaptive array antenna, a signal processing time is required for adaptive control on weighting factors. As a consequence, communication is interrupted for the signal processing time required for adaptive control accompanying the change from the beam pattern 1011 to the beam pattern 1012.

As described above, in a mobile communication terminal equipped with a conventional adaptive array antenna whose directivity characteristics can be adaptively changed, a signal processing time is required to adaptively control weighting factors for directivity synthesis for the adaptive array antenna. For this reason, communication is interrupted during the signal processing time required for adaptive control accompanying a change in beam pattern at the time of handover.

BRIEF SUMMARY OF THE INVENTION

The present invention has been made to solve the above problems, and has as its object to provide a mobile communication terminal apparatus using an adaptive array antenna which can realize handover at high speed.

According to the embodiment of the present invention, there is provided a mobile communication terminal apparatus which communicates with either a first base station or a second base station and performs a handover from one to another of the base stations. The mobile communication terminal apparatus comprises: an array antenna which outputs a plurality of signals; a plurality of multipliers that multiply the signals output from the array antenna by weighting factors, and output multiplication result signals; a reception device configured to generate a reception signal based on the multiplication result signals output from the multipliers; a control device configured to perform a calculation for the weighting factors based on the reception signal, and adaptively control the multipliers by supplying the calculated weighting factors thereto; and an initial value calculating device configured to calculate at least one initial value for the weighting factors prior to the handover. In this apparatus, the control device starts the calculation for the weighting factors using the initial value when the handover is performed.

DETAILED DESCRIPTION OF THE INVENTION

The embodiments of the present invention will be described below with reference to the accompanying drawing.

First Embodiment

Figure 1:
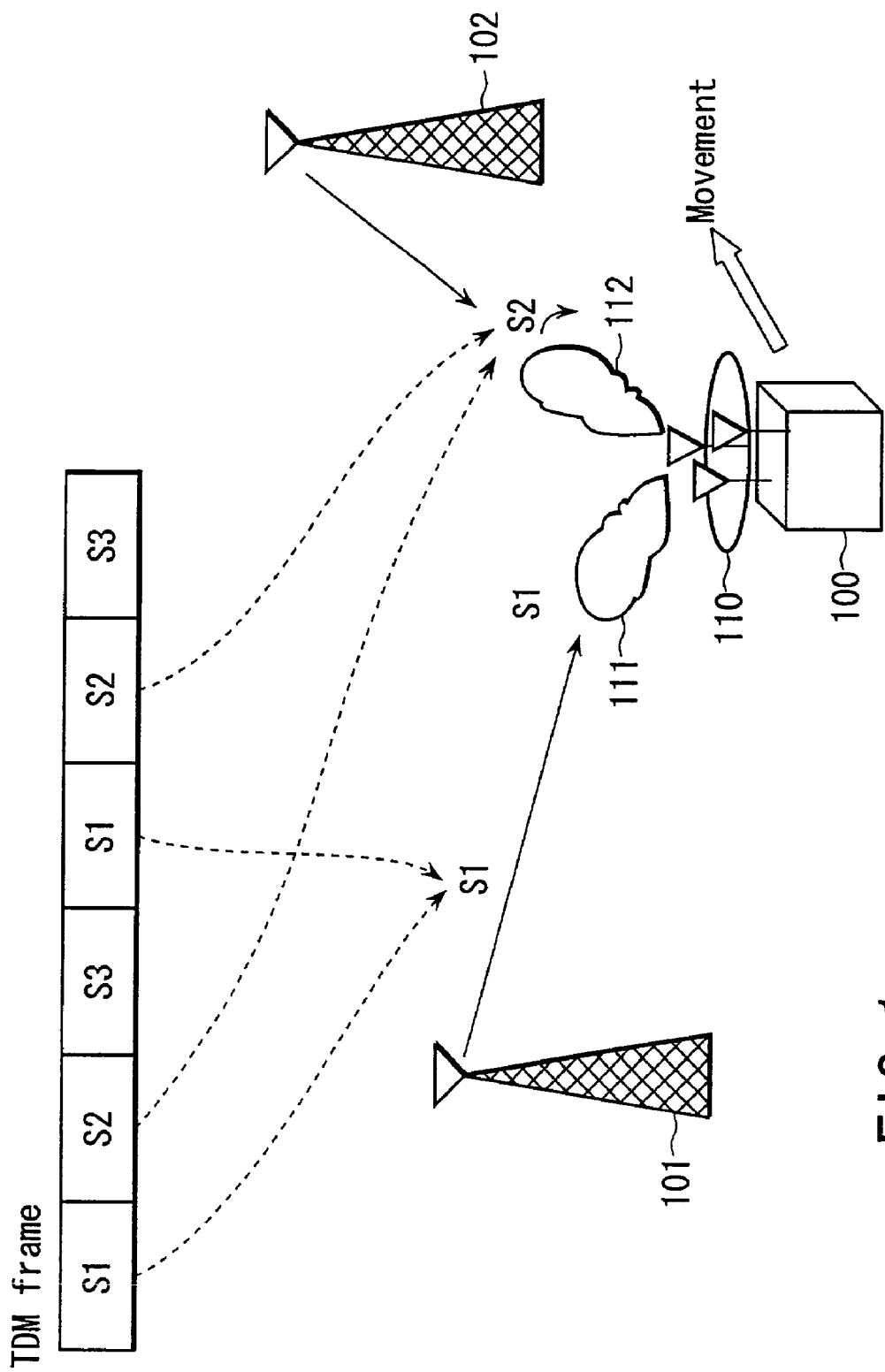
FIG. 1 is a view for explaining an outline of a radio communication system including a mobile terminal apparatus according to the first embodiment of the present invention.

FIG. 1 is a view for explaining an outline of a radio communication system according to the first embodiment of the present invention. FIG. 1 shows a state where a mobile communication terminal apparatus (to be simply referred to as a mobile terminal hereinafter) 100 such as a portable telephone, portable radio unit, or portable information terminal having an adaptive array antenna is communicating with a base station 101 by the TDMA (Time Division Multiple Access) communication scheme.

In the TDMA communication scheme, as indicated by the upper side of FIG. 1, a communication channel is divided into a plurality of frames (TDM frames), and each TDM frame is divided into a plurality of time slots S1, S2, and S3. When the mobile terminal 100 is to perform communication, one time slot is generally assigned to it per frame.

In the case shown in FIG. 1, time slot S1 is assigned for communication from the base station 101 to the mobile terminal 100. In time slot S1 in each TDM frame, the mobile terminal 100 receives a transmission signal from the base station 101 by using an antenna beam 111 combined by an array antenna 110. In other time slots S2 and S3, the base station 101 outputs no transmission signal to the mobile terminal 100.

The mobile terminal 100 estimates the arrival direction of radio waves from a neighboring base station 102 other than the base station 101, with which the mobile terminal is currently communicating, by using the time zones of time slots S2 and S3 other than time slot S1 used for reception or a predetermined period of time taken for antenna beam switching, e.g., a time zone except for portions near the beginning of time slot S2 and the end of time slot S3. If the mobile terminal 100 is not moving at high speed, there is no need to estimate arrival directions in all the time zones of time slots S2 and S3. However, in consideration of at least the moving speed of the mobile terminal 100, arrival direction estimation is performed at time intervals at which arrival direction estimation results do not extremely vary. A specific example of this arrival direction estimation will be described in detail later.

The mobile terminal 100 calculates a weighting factor for directing an antenna beam to an estimated arrival direction or calculates a weighting factor for null-steering the base station 101 that is currently performing communication by using time slot S1 and stores it in a memory, together with, for example, an arrival direction estimation result and reception level information. In performing handover from the base station 101 to the base station 102, the arrival direction estimation result and weighting factor that have been calculated and stored in the memory are used as initial values, and adaptive control on the adaptive array antenna is started.

With this operation, even if communication is abruptly interrupted as the mobile terminal 600 separates from the base station 601 in communication or an obstacle such as a building comes between the terminal an the base station 601, the mobile terminal 100 can make adaptive control on the adaptive array antenna quickly converge, thus solving the conventional problems. This operation will be described in more detail below.

Figure 2:
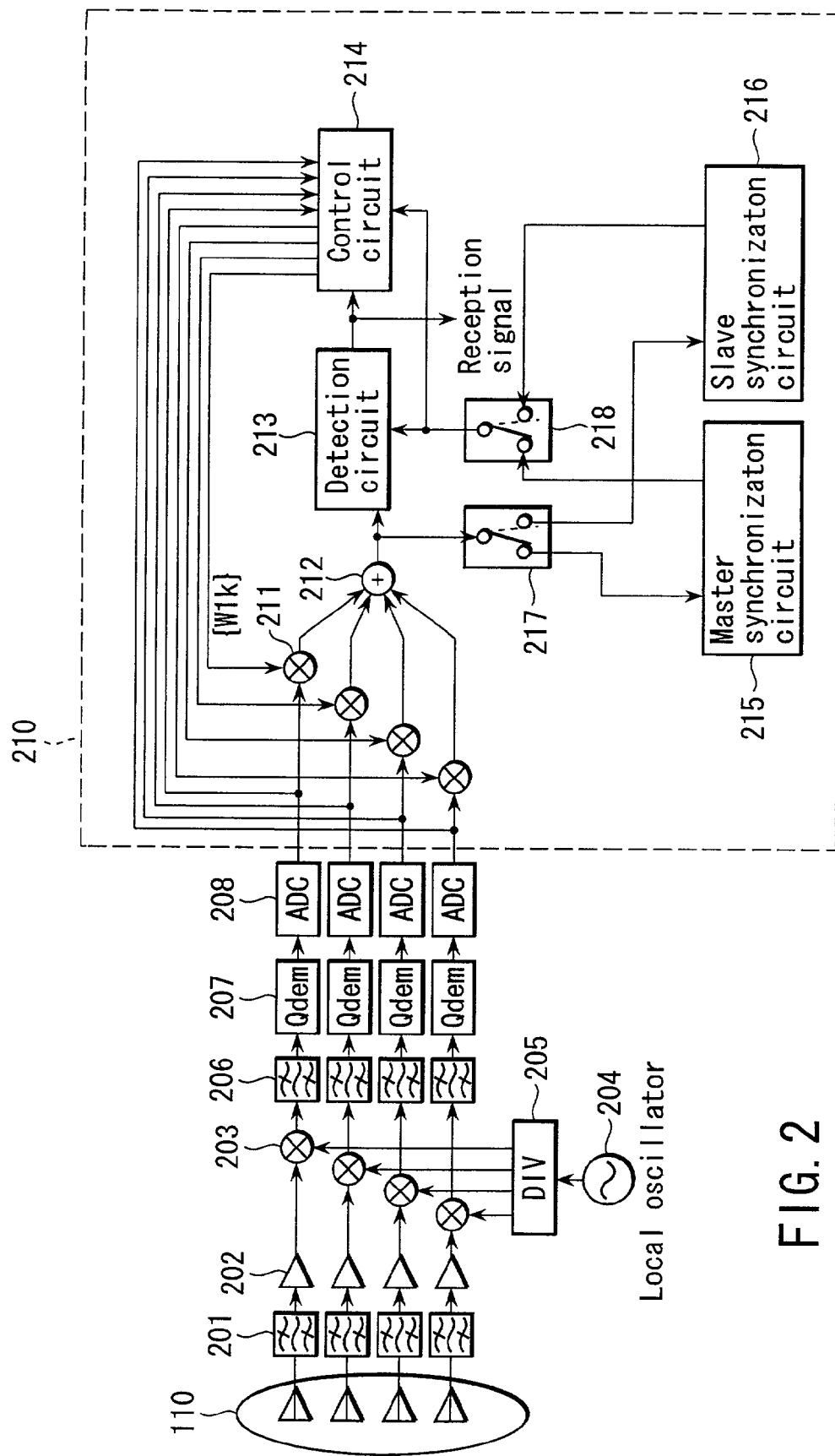
FIG. 2 is a block diagram showing the arrangement of a transceiver in the mobile terminal apparatus according to the first embodiment.

FIG. 2 shows an example of the arrangement of a transceiver used in the mobile terminal 100 according to this embodiment. The array antenna 110 shown in FIG. 1 is used. This antenna is formed by arraying a plurality of antenna elements A1, A2, A3, and A4 in a predetermined shape, e.g., a linear or circular shape. Unnecessary components are removed from an output signal from each of the antenna elements of the array antenna 110 by a filter (e.g., bandpass filter) 201. The resultant signal is amplified by a low-noise amplifier (LNA) 202 and input to a mixer 203. This signal is then multiplied by a local signal supplied from a local oscillator 204 through a distributor 205 to be frequency-converted (downconverted). A filter 206 removes unnecessary components from the output from the mixer 203. The resultant signal is demodulated by a quadrature demodulator 207 and converted into a digital signal by an A/D converter (ADC) 208. The bandpass filters 201, LNAs 202, mixers 203, local oscillators 204, distributors 205, filters 206, quadrature demodulators 207, and A/D converters 208 are equal in number to the antenna elements of the array antenna 110.

The digital signals output from the A/D converters 208 are input to a digital signal processing section (DSP) 210. In the digital signal processing section 210, the digital signals from the A/D converters 208 are input to multipliers (complex multipliers) 211 to be multiplied by weighting factors (complex weighting factors) concerning amplitude and phase. The outputs from the multipliers 211 are added by an adder 212. The output from the adder 212 is detected by a detection circuit 213. The output from the detection circuit 213 is supplied as a reception signal to the subsequent circuit (not shown) and also input to a control circuit 214. The digital signals from the A/D converters 208 have also been input to the control circuit 214. The control circuit 214 supplies weighting factors to the multipliers 211. The control circuit 214 will be described in detail later.

In addition to a master synchronization circuit 215 used for transmission/reception to/from the base station 101 that is currently communicating with the mobile terminal 100, the digital signal processing section 210 includes a slave synchronization circuit 216 used for transmission/reception to/from at least one base station (e.g., the base station 102 in FIG. 1) other than the base station 101. These synchronization circuit 215 and 216 are circuits for performing bit synchronization and frame synchronization and formed by using, for example, PLLs (Phase Locked Loops). The synchronization circuits 215 and 216 are switched by using switches 217 and 218.

When the mobile terminal 100 is to communicate with the base station 101, the switches 217 and 218 are connected to the sides indicated by the solid lines. In this state, the output from the adder 212 is input to the master synchronization circuit 215 through the switch 217, and the output from the master synchronization circuit 215 is input to the detection circuit 213 and control circuit 214 through the switch 218. Likewise, when the mobile terminal 100 is to communicate with the base station 102, the switches 217 and 218 are connected to the sides indicated by the dashed lines. In this state, the output from the adder 212 is input to the slave synchronization circuit 216 through the switch 217, and the output from the slave synchronization circuit 216 is input to the detection circuit 213 and control circuit 214 through the switch 218. The signals supplied from the synchronization circuits 215 and 216 to the detection circuit 213 are reference signals for synchronous detection, and clock signals synchronized with these reference signals are input to the control circuit 214.

As described above, in the mobile terminal 100, the slave synchronization circuit 216 used to receive a transmission signal from another base station 102 is prepared in addition to the master synchronization circuit 215 used to receive a transmission signal from the base station 101 in communication. This makes it possible to obtain excellent error rate characteristics by synchronous detection even during intermittent transmission/reception of signals to/from the base station 102. In addition, this allows the control circuit 214 to easily apply a necessary direction estimation algorithm to a signal after detection by the detection circuit 213.

Furthermore, the mobile terminal 100 receives a signal from the base station 102 other than the base station 101 in a burst form, i.e., intermittently. For this reason, the PLL time constant used for the slave synchronization circuit 216 during a reception period is made to differ from that during a non-reception period. During a non-reception period, the time constant is increased so as not to change a parameter much to suppress variations in phase. This makes it possible to keep a synchronous state even during the non-reception period, and allows synchronous detection from different base stations.

The control circuit 214 will be described next with reference to FIG. 3.

Figures 3, 4:
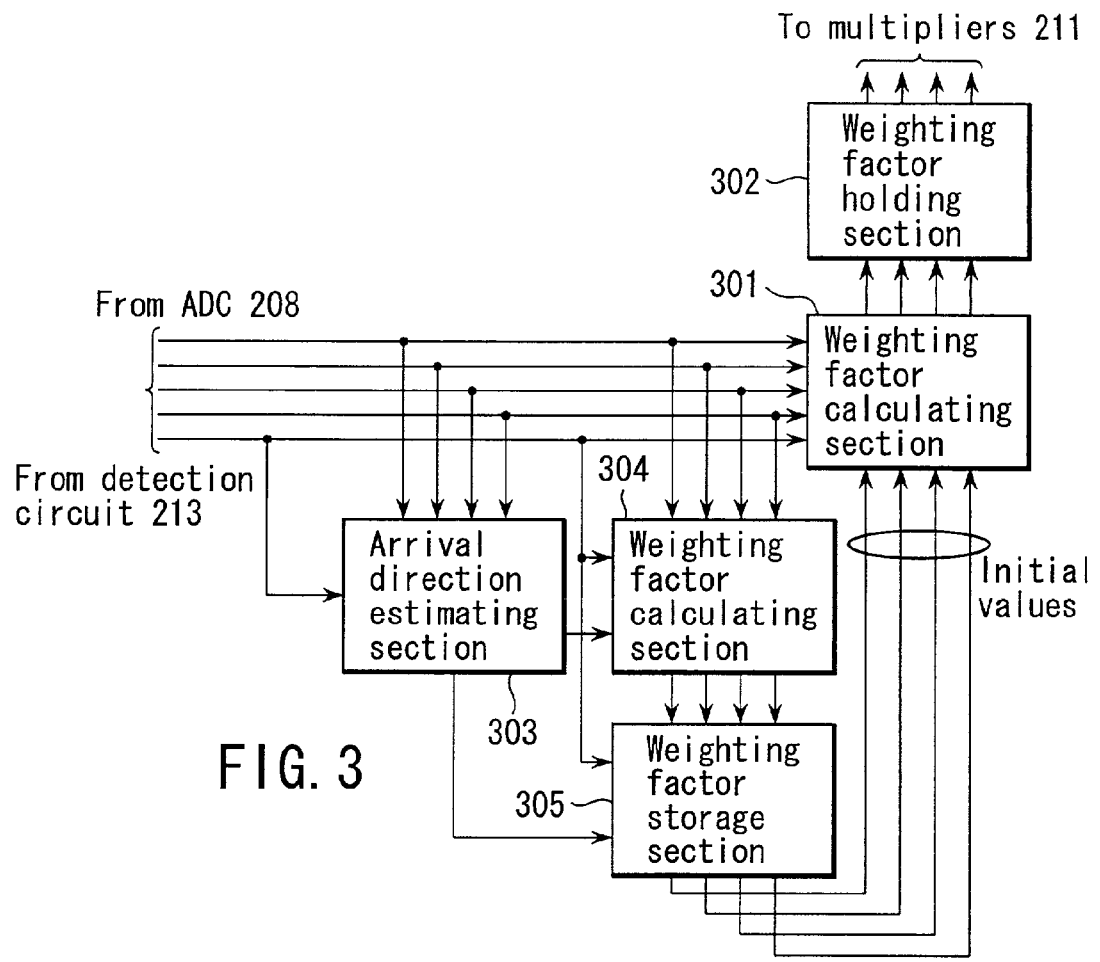
FIG. 3 is a block diagram showing the arrangement of a control circuit in the first embodiment.
FIG. 4 is a view for explaining an arrival direction/ weighting factor storage section in the first embodiment.

FIG. 3 shows the arrangement of a portion of the control circuit 214 which is associated with weighting factor control. This portion includes an arrival direction estimating section 303, weighting factor calculating section 304, and weighting factor storage section 305 in addition to a main weighting factor calculating section 301 and weighting factor holding section 302. The main weighting factor calculating section 301 calculates optimal weighting factors on the basis of the digital signals output from the A/D converters 208 and the reception signal from the detection circuit 213 in FIG. 3. This weighting factor calculation is performed on the principle of minimizing, for example, the error signal between a reception signal and a reference signal. The weighting factors calculated by the main weighting factor calculating section 301 are supplied to the multipliers 211 through the weighting factor holding section 302 for holding the weighting factors up to the next frame.

The arrival direction estimating section 303 estimates the arrival direction of radio waves from the base station 102 or the like (to be represented by the base station 102) other than the base station 101 with which the mobile terminal 100 is currently communicating. Examples of this estimation method are:

(1) A "beam scan", i.e., scanning around the mobile terminal 100 by changing the maximum directivity direction of the adaptive array antenna, is performed to detect a direction in which the maximum reception electric field strength is obtained, and the detected direction is estimated as the arrival direction of radio waves. More specifically, the level of a reception signal from the detection circuit 213 is monitored while a beam scan is performed by sequentially changing weighting factors, and a direction corresponding to weighting factors with which the maximum reception signal level is obtained is estimated as an arrival direction.

(2) A "null scan", i.e., scanning around the mobile terminal 100 by changing the null direction corresponding to a valley of the radiation determined of the adaptive array antenna to detect a direction in which the minimum reception electric field strength is obtained, and this direction is estimated as the arrival direction of radio waves. To implement this method, the level of a reception signal from the detection circuit 213 may be monitored while a null scan is performed by sequentially changing weighting factors, and a direction corresponding to weighting factors with which the minimum reception signal level is obtained may be estimated as an arrival direction.

(3) Direction estimation may be performed by using, for example, a method based on eigenvalue development such as MUSIC (Multiple Signal Classification) or ESPRIT (Estimation of Signal Parameters via Rotational Invariance Techniques) known as a high-resolution arrival direction estimation algorithm, or root MUSIC or unitary ESPRIT which are modifications of these methods. Although these methods require larger signal processing amounts for estimation, the estimation precision is high.

If the arrival direction of radio waves from the base station 102 is successfully estimated by the arrival direction estimating section 303, weighting factors for directing an antenna beam toward the arrival direction are calculated by the weighting factor calculating section 304. The weighting factors calculated in this manner are stored in the weighting factor storage section 305 in a table form like that shown in FIG. 4 in correspondence with the arrival direction and reception level. In some cases, there are a plurality of neighboring base stations 102 other than the base station 101 in communication. Therefore, weighting factors corresponding to the arrival directions of radio waves from the respective base stations are stored in correspondence with the arrival directions and reception levels. "Reception level" indicates the level of a reception signal output from the detection circuit 213. Note that since the arrival directions and weighting factors in the table shown in FIG. 4 exhibit a one-to-one correspondence, the information about arrival directions may be omitted.

When the mobile terminal 100 needs to perform handover, weighting factors corresponding to the maximum reception level are read out from the weighting factor storage section 305. The main weighting factor calculating section 301 receives the weighting factors read out from the weighting factor storage section 305 as initial values, and starts calculating (updating) weighting factors from the initial values, i.e., adaptive control on the optimal weighting factors for communication with the base station 102.

Figure 5:
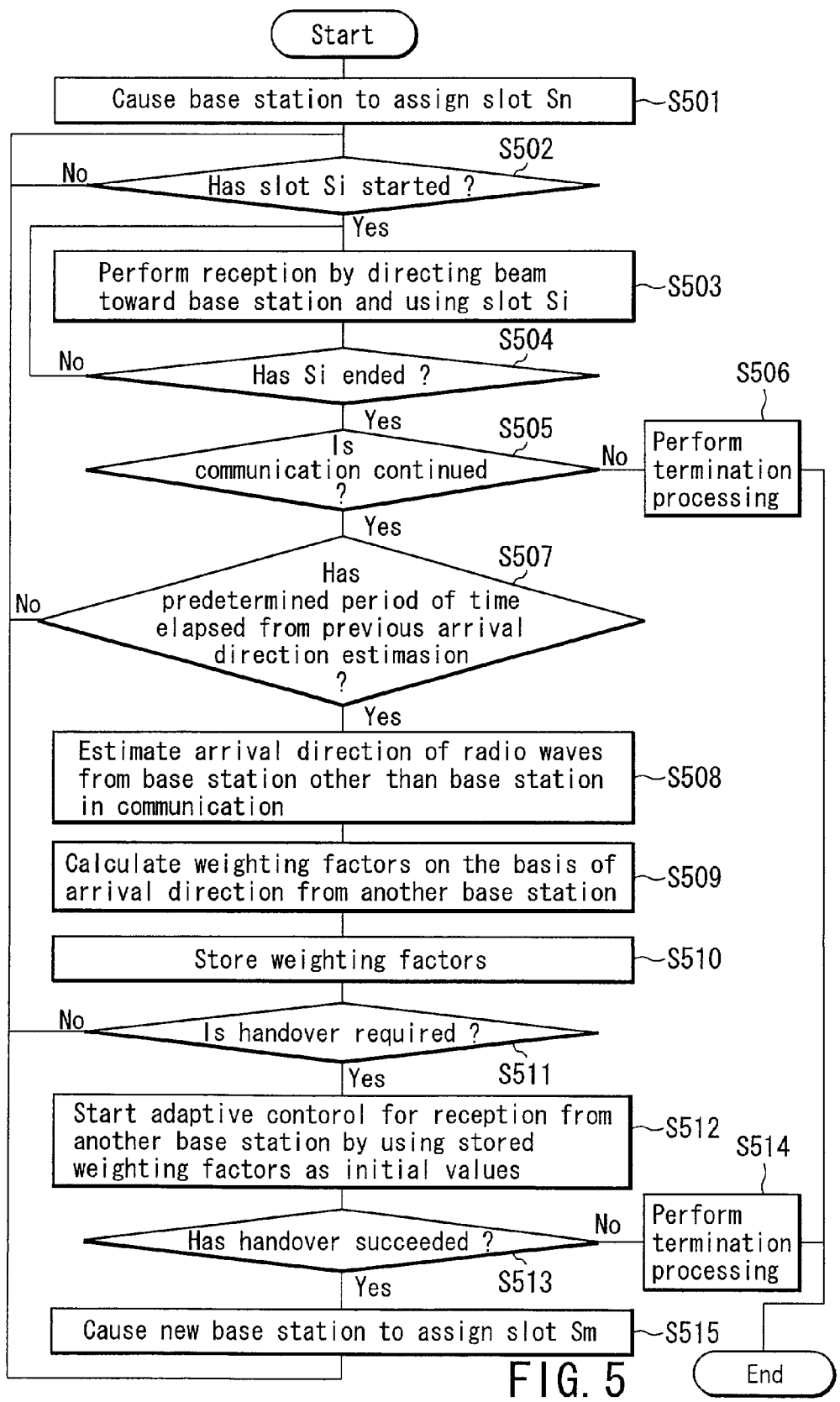
FIG. 5 is a flow chart showing the main flow of processing in the first embodiment.

The flow of processing in this embodiment will be described next with reference to the flow chart of FIG. 5.

First of all, the base station 101 assigns time slot Sn (e.g., Sn=S1) used for communication with the mobile terminal 100 (S501). When time slot Si is then set to Sn, and time slot Sn starts, the mobile terminal 100 directs an antenna beam to the base station 101, receives a transmission signal from the base station 101 by using time slot Sn, and continues this reception until the end of time slot Sn (S502 to S504). It is checked at the end of time slot Sn whether the communication is to be continued (S505). If it is determined that the communication is not continued, termination processing is performed (S506). If it is determined that the communication is to be continued, it is checked whether a predetermined period of time or more has elapsed from the previous arrival direction estimation (S507).

If it is determined in step S507 that the predetermined period of time has not elapsed at the end of time slot Sn, the flow returns to step S502. If it is determined that the predetermined period of time has elapsed, the arrival direction estimating section 303 estimates the arrival direction of radio waves from the base station 102 other than the base station 101 which is currently communicating with the mobile terminal 100 (S508). The weighting factor calculating section 304 calculates weighting factors on the basis of the estimated arrival direction (S509). The estimated arrival direction, the reception level, and the calculated weighting factors are then stored in the weighting factor storage section 305 in correspondence with each other (S510).

If it is determined in step S511 that the mobile terminal 100 needs to perform handover while communicating with the base station 101, i.e., the mobile terminal 100 needs to shift to communication with the base station 102 while communicating with the base station 101, the weighting factors corresponding to the arrival direction of radio waves from the base station 102, which are stored in the weighting factor storage section 305, are supplied as initial values to the main weighting factor calculating section 301 to start adaptive control on weighting factors for the reception of radio waves from the base station 102 (S512).

Assume that there are a plurality of base stations 102 around the base station 101. In this case, since weighting factors corresponding to the arrival directions of radio waves from these base stations 102 are stored in the weighting factor storage section 305, together with the arrival directions and reception levels, weighting factors corresponding to one of these base stations which exhibits the highest reception level are supplied as initial values to the main weighting factor calculating section 301 in step S512, thereby starting adaptive control on weighting factors for the reception of radio waves from the base station exhibiting the highest reception level.

If it is determined in step S513 that handover from the base station 101 to the base station 102 has failed, termination processing is performed (S514). If the handover has succeeded, the base station 102 assigns time slot Sm (S515), and Si is set to Sm to repeat the processing after step S502.

As described above, according to this embodiment, when the mobile terminal 100 is to perform handover from the base station 101 to the base station 102, weighting factors calculated in advance in accordance with the arrival direction of radio waves from the base station 102 are supplied as initial values from the weighting factor storage section 305 to the weighting factor calculating section 301, thus making adaptive control on weighting factors quickly converge.

Alternatives of the present embodiment are explained below.

Figure 6:
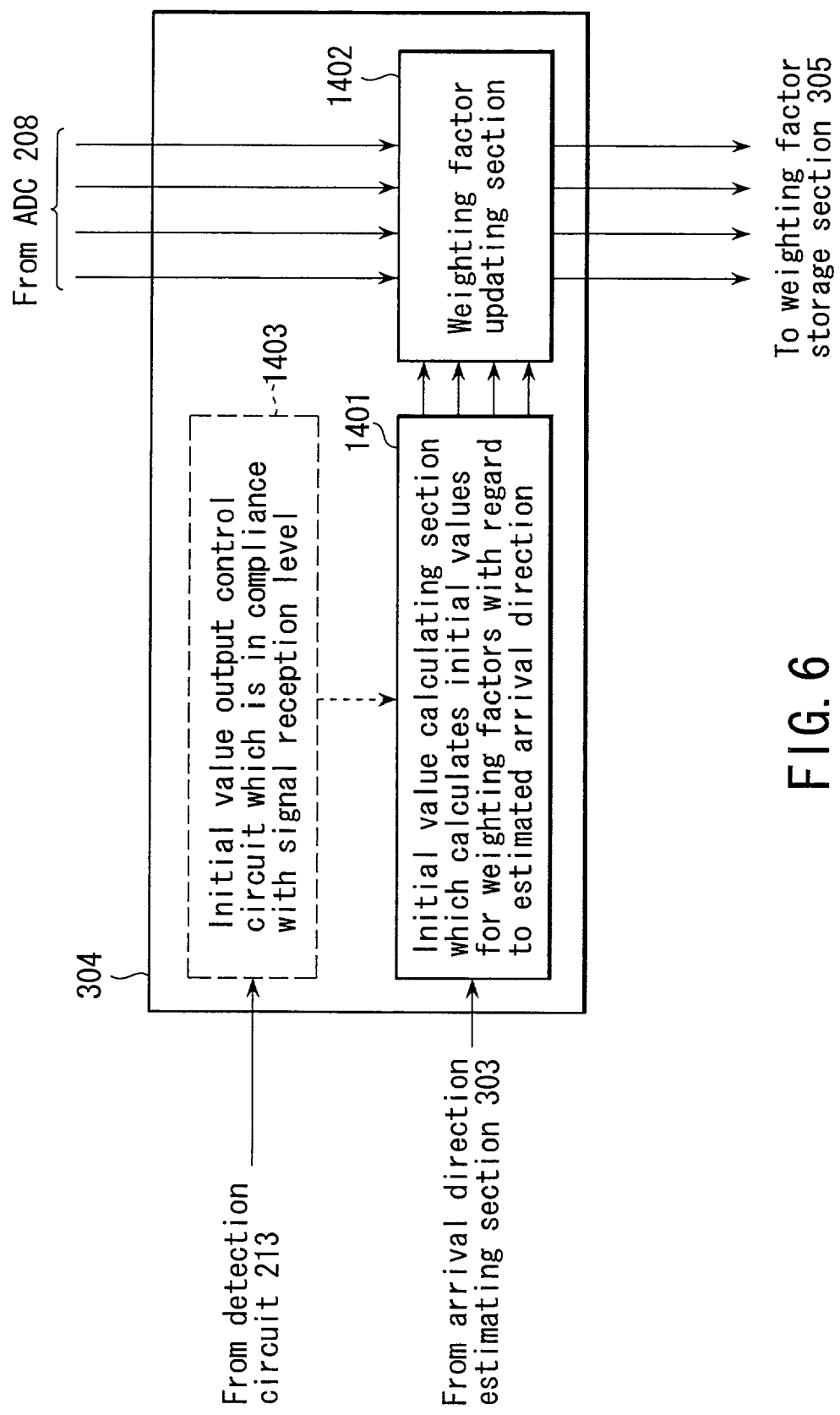
FIG. 6 illustrates an example of the internal structure of the weighting factor calculating section 304 shown in FIG. 3.

FIG. 6 illustrates an example of the internal structure of the weighting factor calculating section 304 shown in FIG. 3.

In this detailed example, a weighting factor initial value calculating section 1401 which calculate the value directed from an estimated arrival direction, has a function similar to that of the weighting factor calculating section 304. The calculating section 1401 calculates a weighting factor with which the maximum directivity can be directed in an estimated arrival direction on the basis of the arrival direction estimation result from the arrival direction estimating section 303, and then outputs the calculated result as an initial value. The weighting factor updating section 1402 handles this initial value as an initial value for the weighting factor for an array antenna used for receiving a signal from a corresponding base station other than those being engaged in communications. The weighting factor updating section 1402 also receives an ADC output received via each antenna element. The updating section 1402 applies an adaptive control algorithm such as LMS (Least Mean Square) to the initial value, and thus the weighting factor is updated. With this structure, such an advantage that the converging time can be shortened as compared to the case where a direct output from the calculating section 1401 is given as the initial value to the main weighting calculating circuit 301 at the time of handover.

It should be noted that in the above remodeled version, the arrival directions and weighting factors do not exhibit a one-to-one correspondence with respect to the table shown in FIG. 4.

Another version proposes a structure such as shown in FIG. 6, in which an initial value output control circuit 1403 which is in compliance with the signal reception level is provided. In this version, only when the received signal level is detected to be larger than a predetermined threshold value on the basis of the data regarding the received signal level outputted from the detector circuit 213, it is determined that the error of the estimated result of the arrival direction is small, and accordingly the initial value is outputted from the weighting factor initial value calculating section 1401.

Next, other examples of the controller circuit shown in FIG. 3 are explained bellow.

Figure 7:
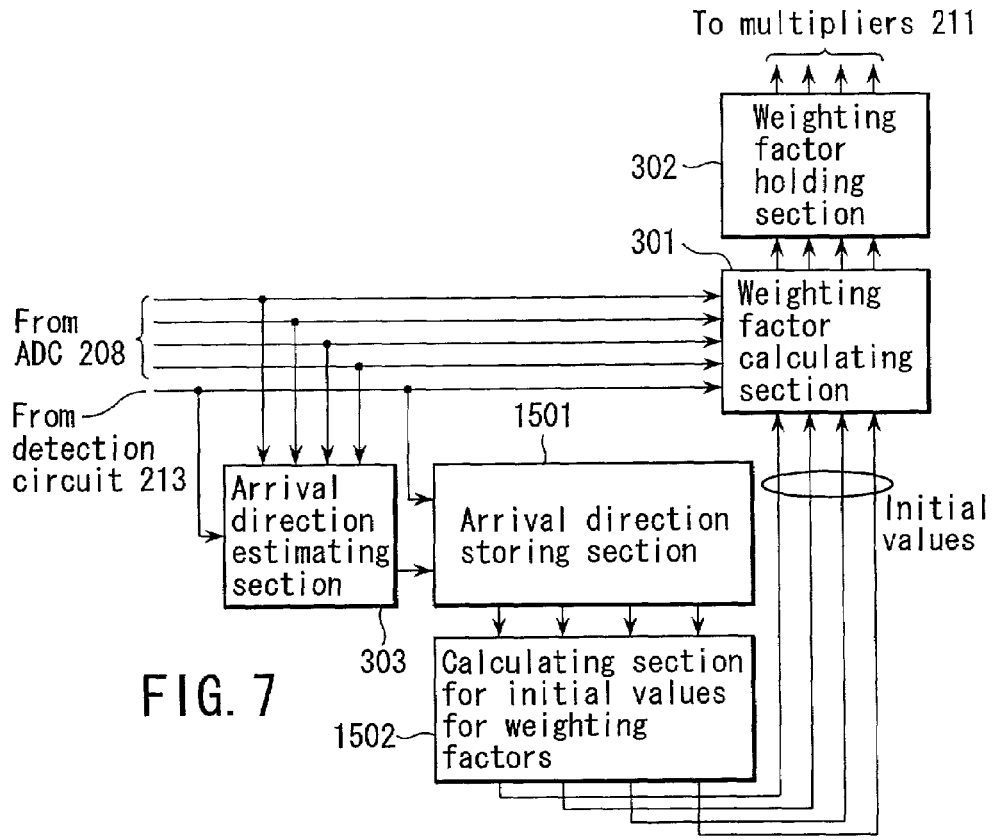
FIG. 7 is a block diagram showing another arrangement of a control circuit in the first embodiment.

FIG. 7 shows a case where only the estimation of an arrival direction to other base station is carried out, and the table of a base station is designed to store estimated arrival directions and received signal levels when they arrive. The advantage of this structure is that the size of the base station table can be reduced. Further, the structure is not designed to calculate the initial value of the weighting factor for each case, and therefore the resources of hardware and software can be assigned diversely to the estimation process for the arrival direction. This structure is particularly suitable for the case of estimating a high resolution arrival direction, which requires a lot of processing time, which is employed in place of the direction estimation by beam scan, which does not usually require such a long time for processing but entails a slightly low accuracy. With this structure, it is possible to improve the direction estimation accuracy.

Figure 8:
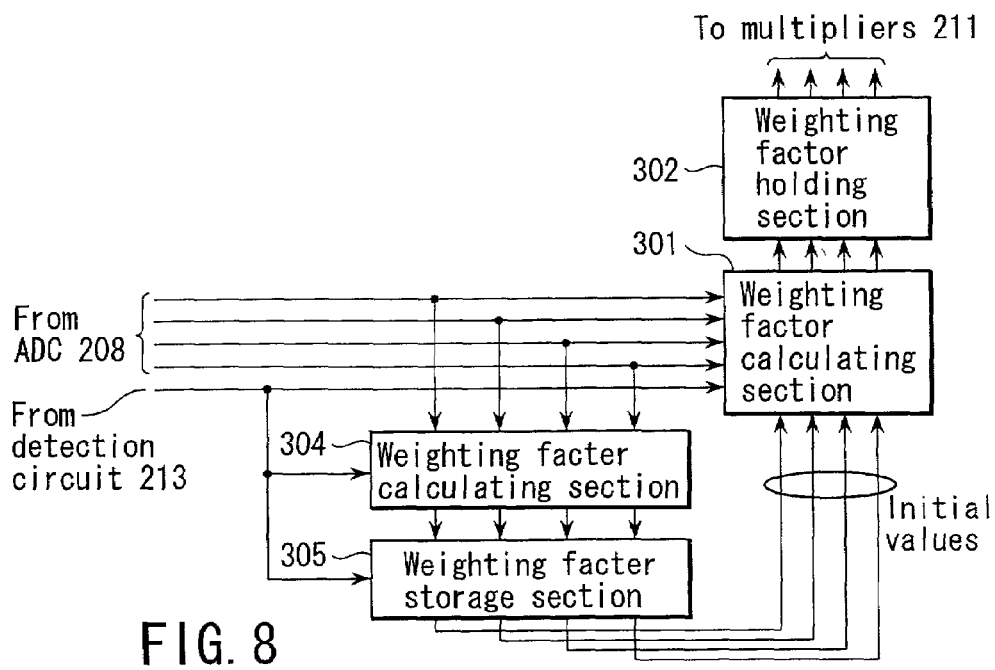
FIG. 8 is a block diagram showing still another arrangement of a control circuit in the first embodiment.

FIG. 8 illustrates the structure of a case where an arrival direction estimation unit is not provided but a second weighting factor calculating circuit is provided. This structure is particularly suitable for the case where the weighting factor to other base station than the base station which is being in communication, can be calculated at an accuracy of some degree without estimating the arrival direction, while receiving signals at a timing other than that of the communication slot with the base station in communications.

Examples of the above case are: the case where there are not many base stations transmitting signals at a timing other than that of the communication slot with the base station being engaged in communications, and the interference is not severe, due to the fact, for example, that the base stations are not densely located, and the case where a secondary modulation (or primary modulation) is carried out on a signal such as another kind of diffusion symbol, and therefore the signals from the base station is less likely to be interfered with after reverse diffusion of the secondary modulation.

It should be noted that the advantage of the structure shown in FIG. 3 is that the initial value of weighting on each antenna element is already calculated at the time of handover, and therefore the calculation amount in the handover is less as compared to the structure shown in FIG. 7. Further, the advantage of the structure shown in FIG. 3 (and FIG. 6) which includes an arrival direction estimating unit is that the estimation result of the arrival direction can be used for the initial value of the weighting calculating circuit, and therefore the conversing speed of the repetitious calculations for the weighting factor for the antenna is improved as compared to the case shown in FIG. 8.

Second Embodiment

Figure 9:
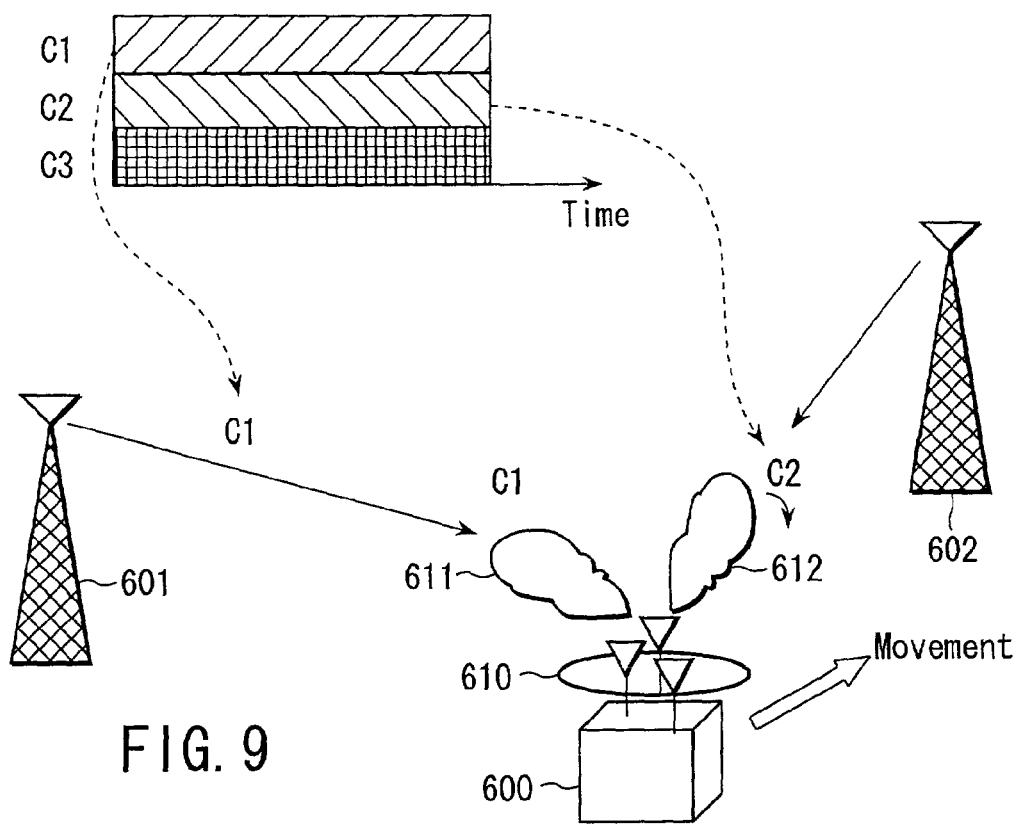
FIG. 9 is a view for explaining an outline of a radio communication system including a mobile terminal apparatus according to the second embodiment of the present invention.
Figure 16:
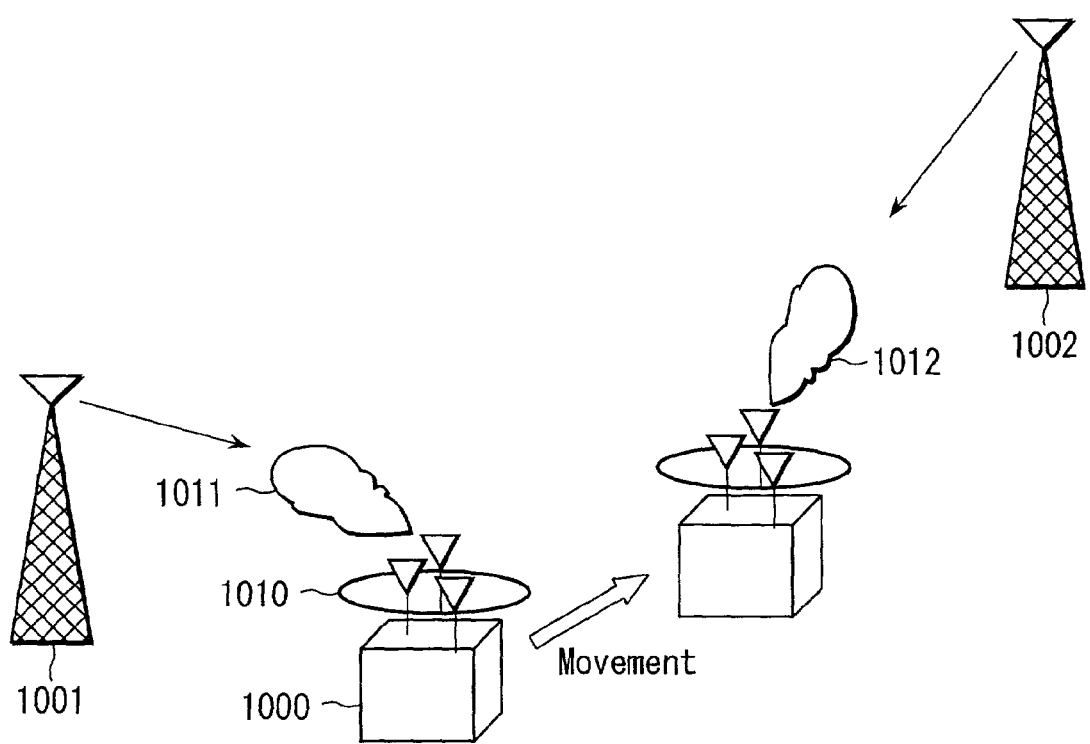
FIG. 16 is a view for explaining an outline of a radio communication system including conventional mobile communication terminal apparatuses.

The second embodiment of the present invention will be described next. FIG. 9 is a view for explaining an outline of a radio communication system according to the second embodiment. Like FIG. 1, FIG. 9 shows a state where a mobile communication terminal apparatus (to be simply referred to as a mobile terminal hereinafter) 600 equipped with an adaptive array antenna, such as a portable telephone, portable radio unit, or portable information terminal is communicating with a base station 601 by the CDMA (Code Division Multiple Access) communication scheme.

According to the CDMA communication scheme, as indicated by the upper side of FIG. 9, communication channels are multiplexed by a plurality of types of spreading codes C1, C2, and C3. The mobile terminal 600 has, for example, two reception circuits including beam combining/despreading circuits and is designed to form antenna beams 611 and 612 by using the respective reception circuits. In the case shown in FIG. 9, the mobile terminal 600 receives a transmission signal from the base station 601, which uses the spreading code C1, by using the antenna beam 611 formed by one of the reception circuits.

The mobile terminal 600 also estimates the arrival direction of radio waves which use the spreading code C2 and are sent from the neighboring base station 602 other than the base station 601 in communication by, for example, scanning around the terminal by deflecting the antenna beam 612 formed by the other reception circuit or performing signal processing for an input signal vector to the adaptive array antenna. In this case, in consideration of the moving speed of the mobile terminal 600, arrival direction estimation is performed at time intervals at which arrival direction estimation results do not extremely vary.

Subsequently, the mobile terminal 600 calculates weighting factors for directing an antenna beam toward the estimated arrival direction in accordance with the arrival direction estimation result, as in the first embodiment, or weighting factors that can null-steer the base station 601 in communication, and stores them in the memory, together with the arrival direction estimation result. In performing handover from the base station 601 to the base station 602, the arrival direction estimation result and weighting factors calculated and stored so far are supplied as initial values, thereby starting adaptive control on the adaptive array antenna.

With this operation, even if communication is abruptly interrupted as the mobile terminal 600 separates from the base station 601 in communication or an obstacle such as a building comes between the terminal an the base station 601, divergence of adaptive control on the adaptive array antenna can be quickened.

Figure 10:
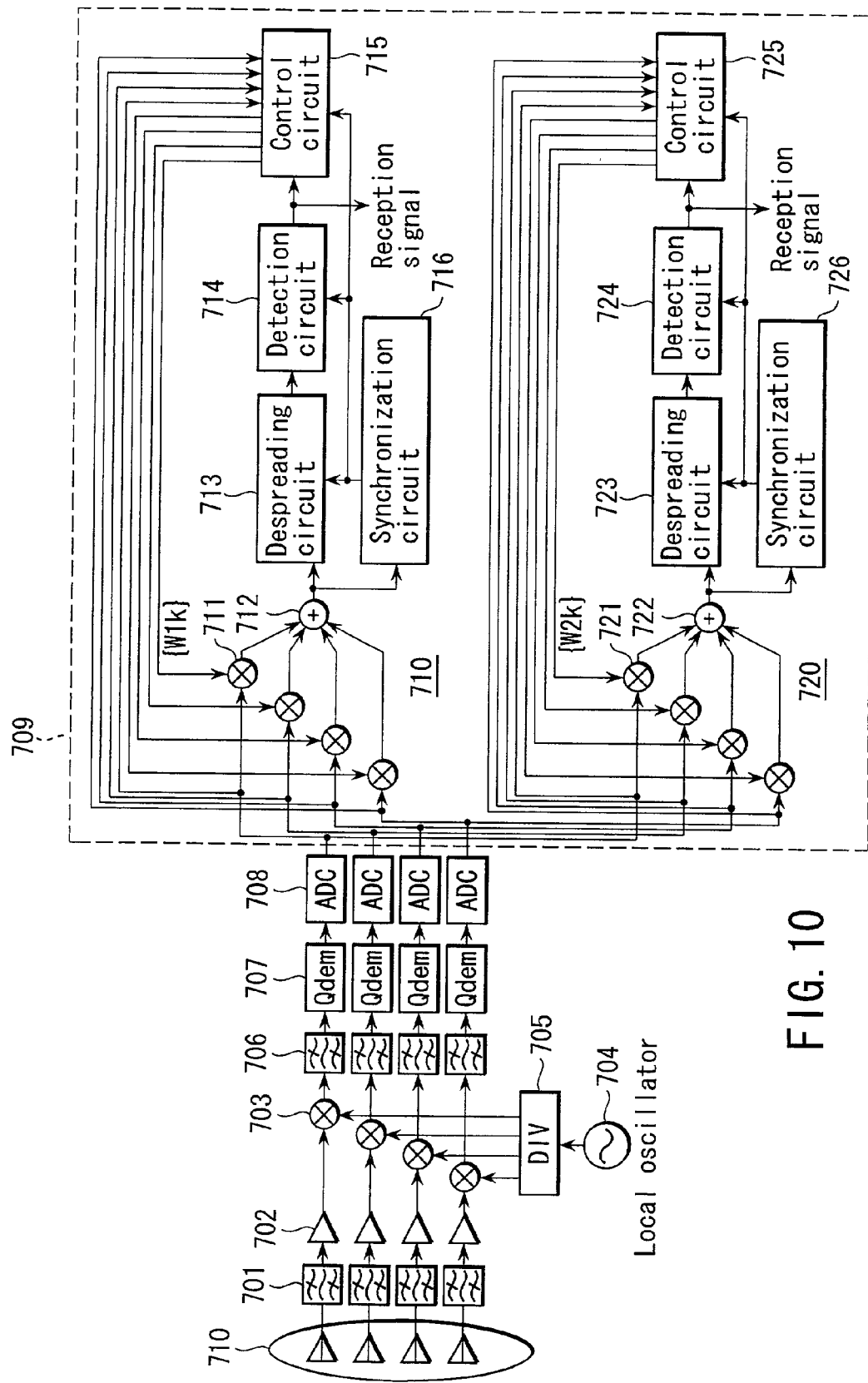
FIG. 10 is a block diagram showing the arrangement of a transceiver in the mobile terminal apparatus according to the second embodiment.

FIG. 10 shows an example of the arrangement of a transceiver used in the mobile terminal 600 in this embodiment. An antenna array 610, filters 701, LNAs 702, mixers 703, local oscillator 704, distributor 705, filters 706, quadrature demodulators 707, and A/D converters (ADCs) 708 have the same arrangements as those in the mobile terminal 100 in FIG. 2 according to the first embodiment.

A digital signal processing section (DSP) 709, to which the digital signals output from the A/D converters 708 are input, has two reception circuits 710 and 720. When the mobile terminal 600 receives a transmission signal from the base station 601 with which the terminal is currently communicating, one reception circuit 710 is used. In receiving a transmission signal from another base station 602, the other reception circuit 720 is used.

The digital signals input to the reception circuits 710 an 720 in the digital signal processing section 709 are input a plurality of first multipliers 711 and a plurality of second multipliers 721, which are complex multipliers, to be multiplied by weighting factors (complex weighting factors) associated with amplitude and phase. Outputs from the multipliers 711 and 721 are added by adders 712 and 722, respectively. Outputs from the adders 712 and 722 are despread by despreading circuits 713 and 723 using spreading codes and detected by detection circuits 714 and 724. Outputs from the detection circuits 714 and 724 are supplied as reception signals to the subsequent circuits (not shown) and also input to control circuits 715 and 725. The control circuits 715 and 725 then supplies weighting factors to the multipliers 711 and 721. The basic arrangement of each of the control circuits 715 and 725 is the same a that of the control circuit 214 in FIG. 2 in the first embodiment.

The reception circuits 710 and 720 also have synchronization circuits 716 and 726, respectively. The synchronization circuits 716 and 726 are circuits for performing bit synchronization and frame synchronization when the mobile terminal 600 performs transmission/reception of signals to/from the base stations 601 and 602, i.e., the reception circuits 710 and 720 receive transmission signals from the base stations 601 and 602. For example, these synchronization circuits are formed by using PLLs. The synchronization circuits 716 and 726 respectively supply spreading codes (e.g., C1 and C2) to the despreading circuits 713 and 723, reference signals for synchronous detection to the detection circuits 714 and 724, and clock signals to the control circuits 715 and 725.

By providing the synchronization circuits 716 and 726 for the two reception circuits 710 and 720 in the mobile terminal 600, respectively, excellent error rate characteristics based on synchronous detection can be obtained even in intermittent transmission/reception of signals to/from the base station 602. In addition, this allows the control circuits 715 and 725 to easily apply a necessary direction estimation algorithm to signals after detection by the detection circuits 714 and 724.

Furthermore, the mobile terminal 600 receives a signal from the base station 602 other than the base station 601 in a burst form, i.e., intermittently. For this reason, the PLL time constant used for the synchronization circuit 726 during a reception period is made to differ from that during a non-reception period. During a non-reception period, the time constant is increased so as not to change a parameter much to suppress variations in phase. This makes it possible to keep a synchronous state even during the non-reception period, and allows synchronous detection from different base stations.

The flow of processing in this embodiment will be described next with reference to the flow chart of FIG. 11.

First of all, a spreading code Cn (e.g., Cn=C1) to be used for communication with the base station 601 with which the mobile terminal 600 communicates first is determined (S801). A spreading code Ci is then set to Cn, and the mobile terminal 600 directs an antenna beam to the base station 601 and receives a transmission signal from the base station 601 by using the spreading code Cn (S802). In step S803, it is checked whether the communication is continued. If the communication is not continued, termination processing is performed (S804). If the communication is continued, it is checked whether a predetermined period of time has elapsed since the previous arrival direction estimation (S805).

If it is determined in step S805 that the predetermined period of time has not elapsed from the previous arrival direction estimation, the flow returns to step S802. If the predetermined period of time has elapsed, the arrival direction estimating section in the control circuit 725 estimates the arrival direction of radio waves from the base station 602 other than the base station 601 with which the mobile terminal 600 is currently communicating (S806). The weighting factor calculating section in the control circuit 725 then calculates weighting factor on the basis of the estimated arrival direction (S807). The calculated weighting factors are stored in the weighting factor storage section in the control circuit 725 in correspondence with the estimated arrival direction and reception level (S808).

If it is determined in step S809 that the mobile terminal 600 needs to perform handover while communicating with the base station 601, i.e., the mobile terminal 600 needs to shift to communication with the base station 602 while communicating with the base station 601, the weighting factors corresponding to the arrival direction of radio waves from the base station 602, which are stored in the weighting factor storage section in the control circuit 725, are supplied as initial values to the weighting factor calculating section in the control circuit 725 to start adaptive control on weighting factors for the reception of radio waves from the base station 602 (S810).

Assume that there are a plurality of base stations 602 around the base station 601. In this case, since weighting factors corresponding to the arrival direction of radio waves from the base stations 602 are stored in the weighting factor storage section in the control circuit 725, together with the arrival direction and reception level, weighting factors corresponding to one of the base stations which exhibits the highest reception level are supplied as initial values to the weighting factor calculating section in the control circuit 725, thereby starting adaptive control on weighting factors for the reception of radio waves from the base station exhibiting the highest reception level in step S810.

If it is determined in step S811 that handover from the base station 601 to the base station 602 has failed, termination processing is performed (S812). If the handover has succeeded, the base station 602 and a spreading code Cm are determined (S813), and Ci is set to Cm to repeat the processing after step S802.

As described above, in this embodiment as well, when the mobile terminal 600 is to perform handover from the base station 601 to the base station 602, weighting factors calculated in advance in accordance with the arrival direction of radio waves from the base station 602 are supplied as initial values, thus making adaptive control on weighting factors quickly converge.

Figures 12, 13:
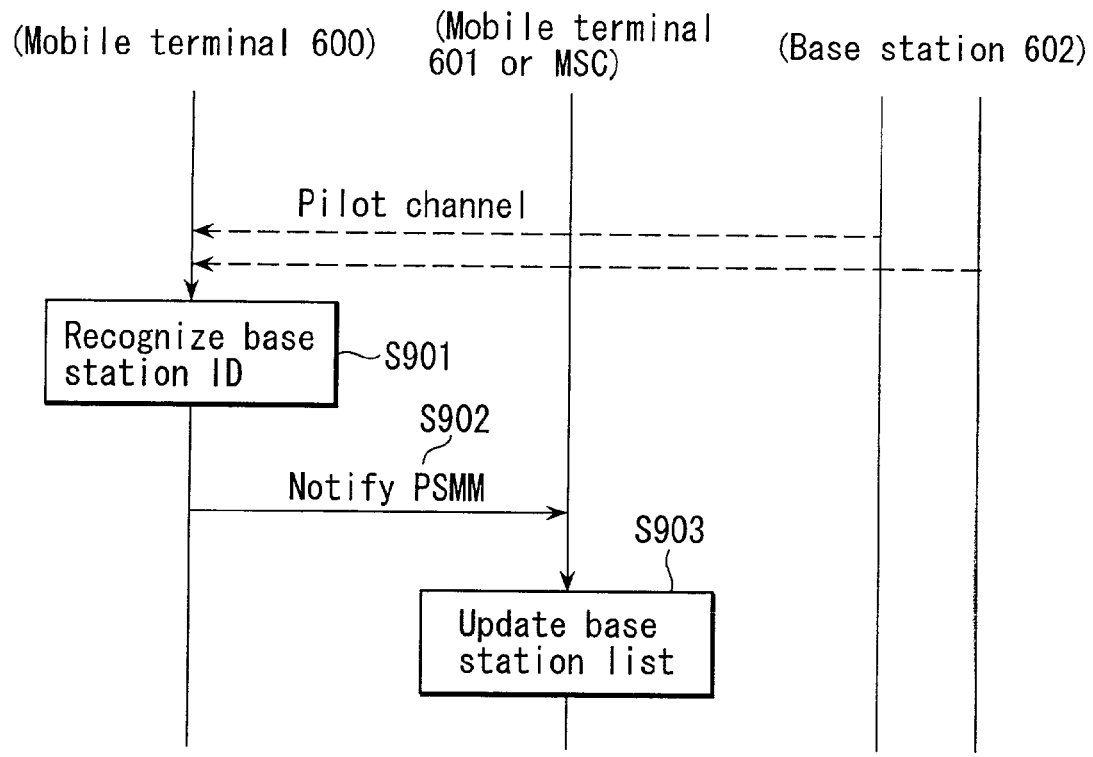
FIG. 12 is a part of a flow chart showing the flow of processing for base station list update in the second embodiment.
FIG. 13 is a view for explaining a base station list.

In addition, this embodiment may also perform handover processing based on a base station list indicating the following link assignment priorities. As shown in FIG. 12, the mobile terminal 600 recognizes the identification information (base station ID) of the base station 602 (arrival direction estimation target) other than the base station 601 with which the terminal is currently communicating from the spreading code multiplexed with a signal on a specific channel such as a pilot channel transmitted from the base station 602 (S901). The mobile terminal 600 then transmits the reception intensity information of radio waves transmitted from the base station 602, e.g., a PSMM (Pilot Strength Measurement Message), to the base station 601 or a control station (MSC), together with the base station ID of the base station 602 (S902). The base station 601 or MSC, which has received this PSMM, then updates the contents of the base station list managed by the station (S903). The PSMM is obtained by the mobile terminal 600 from the reception signal level of a signal on a pilot channel transmitted from the base station 602.

The base station list is a list which indicates a relationship representing the transmission/reception states between the respective mobile terminals and the respective base stations so as to represent link assignment priorities. For example, as shown in FIG. 13, this list is expressed in the form of a table in which the pieces of identification information (terminal IDs) of the respective mobile terminals and the respective base station IDs are made to correspond to each other with relationship parameters of three levels corresponding to PSMMs, namely Active set, Candidate set, and Neighbor set. Referring to FIG. 13, the terminal IDs are expressed by uppercase letters, and the base stations ID are expressed by lowercase letters. Active set corresponds to a case where a signal on a pilot channel transmitted from a given MSC can be received by the mobile terminal 600. Candidate set corresponds to a case where a signal on a pilot channel transmitted from the MSC side is received by the mobile terminal 600 with a sufficient level, but the corresponding base station does not belong to Active set. Neighbor set corresponds to a case where it is expected that a base station will become a candidate, but a signal on a pilot channel transmitted from the MSC side is received only intermittently.

Upon reception of the PSMM transmitted from the mobile terminal 600, the base station or MSC which manages this base station list updates the base station list in FIG. 13. More specifically, the base station or MSC updates the contents of the base station ID written at the intersection between the terminal ID corresponding to the mobile terminal, which has transmitted the PSMM, and a relationship parameter at each level. In some cases, one base station ID is written at each intersection, as shown in FIG. 13. In other cases, a plurality of base station IDs are written at each intersection.

Figure 11:
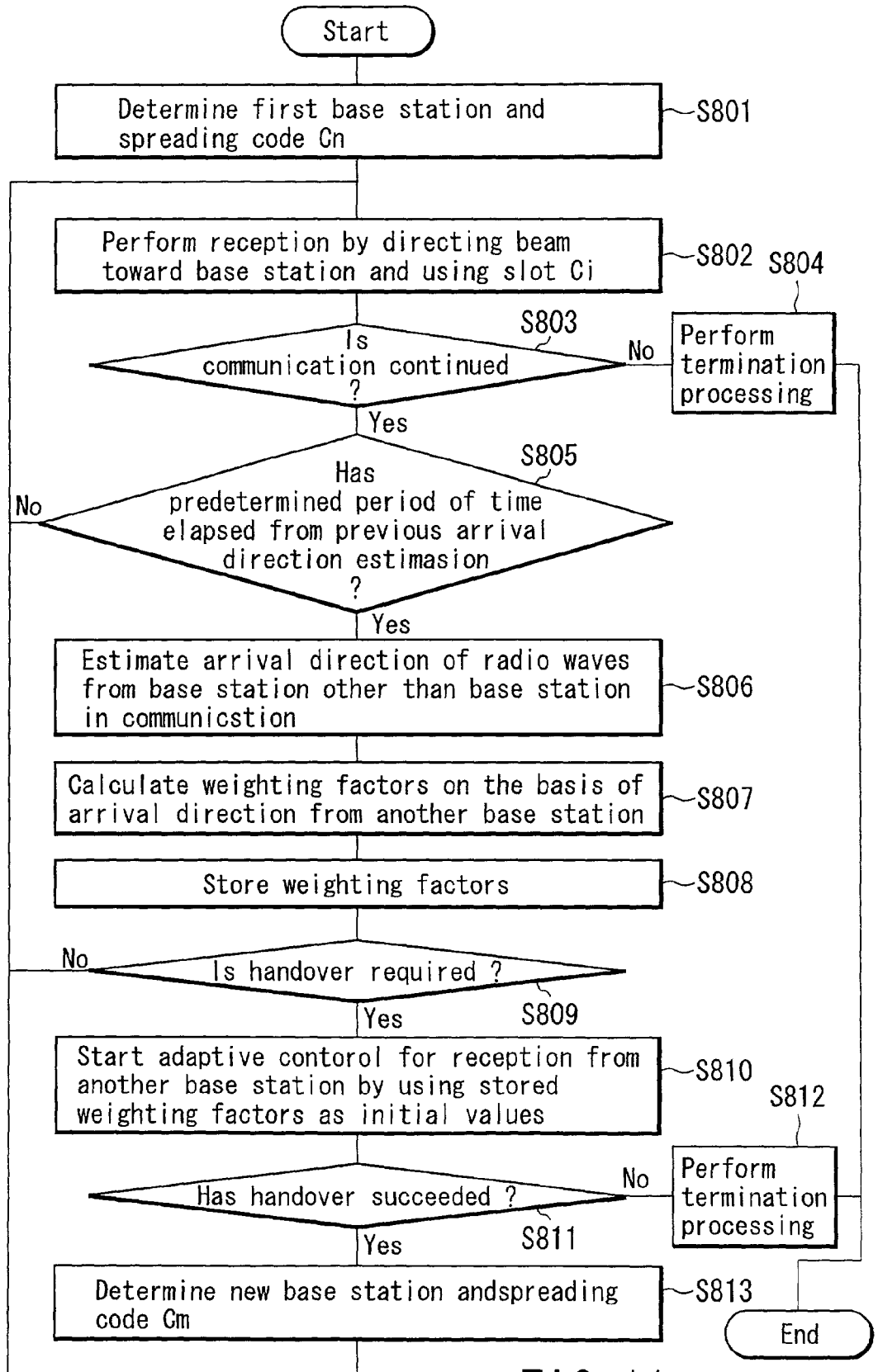
FIG. 11 is a flow chart showing the main flow of processing in the second embodiment.

Here, the following is a description of the processing of S806 shown in FIG. 11. That is, in this processing, a radio wave arrival direction from a base station other than that is currently engaged in communications, is estimated. During the estimation, which base station should be selected to determine the object of the arrival direction of a plurality of other base station groups, is carried out with use of the base station list. This processing will now be described with reference to FIGS. 14 and 15.

Figure 14:
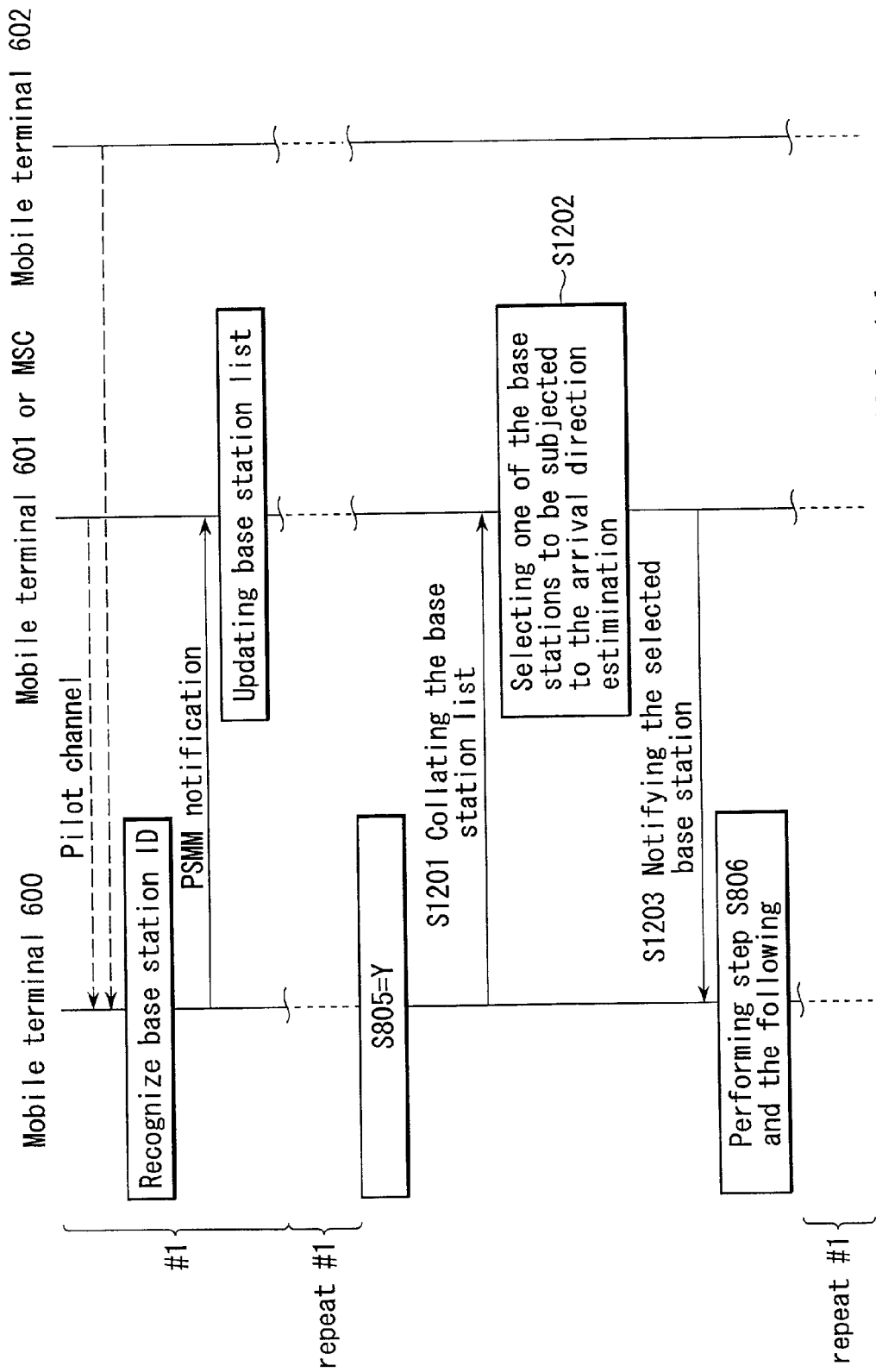
FIG. 14 is another part of a flow chart showing the flow of processing for base station list update in the second embodiment.

In the check process in S805 shown in FIG. 11, when it is determined that a predetermined time period or more has elapsed from one-previous arrival direction estimation, the terminal transmits a command for collating the base station list, to the base station currently engaged therewith in communications, or an MSC via this base station as shown in FIG. 14 (S1201). The base station or MSC which has received the command selects, as a base station to be subjected to the arrival direction, selects:

(1) at least one of base stations if there are any such stations other than the station currently engaged with in communications in the Active set of the base station list;

(2) at least one of stations in cases other than (1), when the Candidate set of the base station list is not empty; or (3) if other than (1) or (2), at least one of stations in the Neighbor set of the base station list (S1202). Then, the selected base station is notified to the mobile terminal 600 (S1203).

Figure 15:
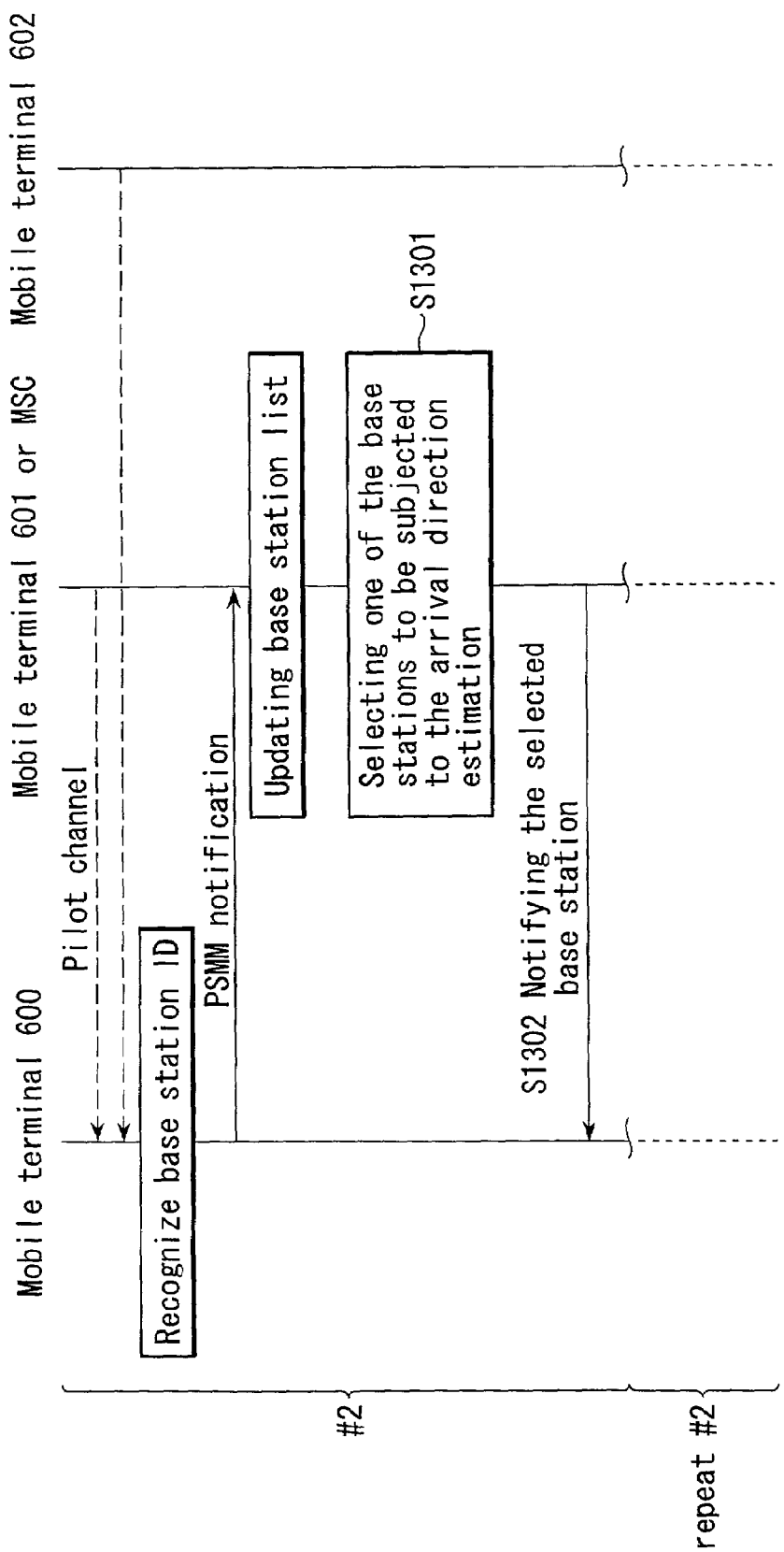
FIG. 15 is another part of a flow chart showing the modified flow of processing for base station list update in the second embodiment.

Alternatively, it is possible to consider such a structure as shown in FIG. 15, in which a base station to be subjected to the arrival direction is selected from the base station list by a method of the above (1) to (3) (S1301) after the base station list update process shown in FIG. 12 (S903), and the selected base station is notified to the mobile terminal 600 (S1302). In this case, unlike the structure shown in FIG. 14, the base station list collation command is not sent to a base station or MSC, and therefore the processing time in S806 can be shortened. On the other hand, with the structure shown in FIG. 14, the selecting operation is conducted only when it is determined that a predetermined time period or more has elapsed from the time of the estimation of the one-previous arrival direction in the judgment process of S805 shown in FIG. 11. Therefore, the overall operation amount can be reduced.

Further, on the terminal side, it is possible to have such a structure in which the candidate of the base station optimal for the next handover is selected in advance based on the average height of electric field intensity values of several previous times as well as the weakest value, from the monitor result of the pilot channel, and then the candidate is selected in S806.

In addition to the above effect of quickening convergence of adaptive control on the adaptive array antenna during handover, highly reliable handover based on a base station list indicating link assignment priorities can be implemented by the same procedure as that in the prior art using an omnidirectivity antenna for each mobile terminal.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. A mobile communication terminal apparatus which communicates with either a first base station or a second base station and performs a handover from one to another of the base stations, the mobile communication terminal apparatus comprising:
    an array antenna which outputs a plurality of signals;
    a plurality of multipliers that multiply the signals output from the array antenna by weighting factors, and output multiplication result signals;
    a reception device configured to generate a reception signal based on the multiplication result signals output from the multipliers;
    a control device configured to perform a calculation for the weighting factors based on the reception signal, and adaptively control the multipliers by supplying the calculated weighting factors thereto; and
    an initial value calculating device configured to calculate at least one initial value for the weighting factors prior to the handover,
    wherein
    the control device starts the calculation for the weighting factors using the initial value when the handover is performed and
    the initial value calculating device includes:
    an estimation device configured to estimate an arrival direction of radio waves radiated from the second base station and arrived at the mobile communication terminal apparatus; and
    a storing device configured to store the initial value of the weighting factors that is calculated with regard to the arrival direction.

2. The mobile communication terminal apparatus according to claim 1, wherein the reception device performs a radio communication between the mobile communication terminal apparatus and the first base station or the second base station in accordance with the TDMA(Time Division Multiple Access) scheme.

3. The mobile communication terminal apparatus according to claim 1, wherein the reception device performs a radio communication between the mobile communication terminal apparatus and the first base station or the second base station in accordance with the CDMA(Code Division Multiple Access) scheme.

4. The mobile communication terminal apparatus according to claim 1, wherein the estimation device acquires a base station list from the first base station or other base stations, and selects the second base station among the other base stations with reference to the base station list.

5. The mobile communication terminal apparatus according to claim 1, wherein the initial value calculating device outputs the initial value for the weighting factors calculated with regard to the arrival direction when a reception level is higher than a predetermined threshold value.

6. A mobile communication terminal apparatus which communicates with either a first base station or a second base station and performs a handover from one to another of the base stations, the mobile communication terminal apparatus comprising:
    an array antenna which outputs a plurality of signals;
    a plurality of multipliers that multiply the signals output from the array antenna by weighting factors, and output multiplication result signals;
    a reception device configured to generate a reception signal based on the multiplication result signals output from the multipliers;
    a control device configured to perform a calculation for the weighting factors based on the reception signal, and adaptively control the multipliers by supplying the calculated weighting factors thereto; and
    an initial value calculating device configured to calculate at least one initial value for the weighting factors prior to the handover,
    wherein
    the control device starts the calculation for the weighting factors using the initial value when the handover is performed,
    the initial value calculating device includes,
    an estimation device configured to estimate an arrival direction of radio waves radiated from the second base station and arrived at the mobile communication terminal apparatus, and
    a storing device configured to store the initial value of the weighting factors that is calculated with regard to the arrival direction,
    the reception device performs a radio communication between the mobile communication terminal apparatus and the first base station or the second base station in accordance with the TDMA(Time Division Multiple Access) scheme, and
    the estimation device estimates said arrival direction through a time zone other than a time slot specified in the TDMA scheme.

7. A mobile communication terminal apparatus which communicates with either a first base station or a second base station and performs a handover from one to another of the base stations, the mobile communication terminal apparatus comprising:
- an array antenna which outputs a plurality of signals;
- a plurality of multipliers that multiply the signals output from the array antenna by weighting factors, and output multiplication result signals;
- a reception device configured to generate a reception signal based on the multiplication result signals output from the multipliers;
- a control device configured to perform a calculation for the weighting factors based on the reception signal, and adaptively control the multipliers by supplying the calculated weighting factors thereto; and
- an initial value calculating device configured to calculate at least one initial value for the weighting factors prior to the handover,
- wherein
- the control device starts the calculation for the weighting factors using the initial value when the handover is performed and
- the initial value calculating device updates the initial value for the weighting factors calculated with regard to the arrival direction by applying an adaptive control algorithm including LMS(Least Mean Square) to the initial value.

8. A mobile communication terminal apparatus which communicates with either a first base station or a second base station and performs a handover from one to another of the base stations, the mobile communication terminal apparatus comprising:
- an array antenna which outputs a plurality of signals;
- a plurality of multipliers that multiply the signals output from the array antenna by weighting factors, and output multiplication result signals;
- a reception device configured to generate a reception signal based on the multiplication result signals output from the multipliers;
- a control device configured to perform a calculation for the weighting factors based on the reception signal, and adaptively control the multipliers by supplying the calculated weighting factors thereto;
- an initial value calculating device configured to calculate at least one initial value for the weighting factors prior to the handover, the initial value calculating device including:
  - an estimation device configured to estimate an arrival direction of radio waves radiated from the second base station and arrived at the mobile communication terminal apparatus; and
  - a storing device configured to store information that identifies the estimated arrival direction;
- wherein
- the control device starts the calculation for the weighting factors using the initial value when the handover is performed.

9. The mobile communication terminal apparatus according to claim 8, wherein the reception device performs a radio communication between the mobile communication terminal apparatus and the first base station or the second base station in accordance with the TDMA(Time Division Multiple Access) scheme.

10. The mobile communication terminal apparatus according to claim 9, wherein the estimation device estimates said arrival direction through a time zone other than a time slot specified in the TDMA scheme.

11. The mobile communication terminal apparatus according to claim 8, wherein the reception device performs a radio communication between the mobile communication terminal apparatus and the first base station or the second base station in accordance with the CDMA(Code Division Multiple Access) scheme.

12. The mobile communication terminal apparatus according to claim 11, wherein the estimation device acquires a base station list from the first base station or other base stations, and selects the second base station among the other base stations with reference to the base station list.

13. The mobile communication terminal apparatus according to claim 8, wherein the initial value calculating device updates the initial value for the weighting factors calculated with regard to the arrival direction by applying an adaptive control algorithm including LMS(Least Mean Square) to the initial value.

14. The mobile communication terminal apparatus according to claim 8, wherein the initial value calculating device outputs the initial value for the weighting factors calculated with regard to the arrival direction when a reception level is higher than a predetermined threshold value.

15. A mobile communication terminal apparatus which communicates with either a first base station or a second base station and performs a handover from one to another of the base stations, the mobile communication terminal apparatus comprising:
- an array antenna which outputs a plurality of signals;
- a plurality of multipliers that multiply the signals output from the array antenna by weighting factors, and output multiplication result signals;
- a reception device configured to generate a reception signal based on the multiplication result signals output from the multipliers;
- a control device configured to perform a calculation for the weighting factors based on the reception signal, and adaptively control the multipliers by supplying the calculated weighting factors thereto;
- an initial value calculating device configured to calculate at least one initial value for the weighting factors prior to the handover;
- a storing device configured to store the calculated initial value;
- wherein
- the control device starts the calculation for the weighting factors using the initial value when the handover is performed.

16. The mobile communication terminal apparatus according to claim 15, wherein the reception device performs a radio communication between the mobile communication terminal apparatus and the first base station or the second base station in accordance with the TDMA(Time Division Multiple Access) scheme.

17. The mobile communication terminal apparatus according to claim 15, wherein the reception device performs a radio communication between the mobile communication terminal apparatus and the first base station or the second base station in accordance with the CDMA(Code Division Multiple Access) scheme.

18. A mobile communication terminal apparatus which communicates with either a first base station or a second base station and performs a handover from one to another of the base stations, the mobile communication terminal apparatus comprising:

an array antenna which outputs a plurality of signals;
a plurality of multipliers that multiply the signals output from the array antenna by weighting factors, and output multiplication result signals;
a reception device configured to generate a reception signal based on the multiplication result signals output from the multipliers;
a control device configured to perform a calculation for the weighting factors based on the reception signal, and adaptively control the multipliers by supplying the calculated weighting factors thereto; and
an initial value calculating device configured to calculate at least one initial value for the weighting factors prior to the handover, wherein
the control device starts the calculation for the weighting factors using the initial value when the handover is performed and the mobile communication terminal apparatus further comprises:
a first synchronization circuit for bit synchronization and frame synchronization, which is used for communication with the first base station; and
a second synchronization circuit for bit synchronization and frame synchronization, which is used for communication with the second base station.

* * * * *